US012179274B2

(12) United States Patent
Luik (10) Patent No.: US 12,179,274 B2
(45) Date of Patent: Dec. 31, 2024

(54) TOOL HOLDER AND TOOL

(71) Applicant: Hartmetall-Werkzeugfabrik Paul Horn GmbH, Tuebingen (DE)

(72) Inventor: Matthias Luik, Reutlingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 683 days.

(21) Appl. No.: 17/226,759

(22) Filed: Apr. 9, 2021

(65) Prior Publication Data

US 2021/0220921 A1 Jul. 22, 2021

Related U.S. Application Data

(63) Continuation of application No. PCT/EP2019/077965, filed on Oct. 15, 2019.

(30) Foreign Application Priority Data

Oct. 17, 2018 (DE) ...................... 10 2018 125 767.8
Oct. 17, 2018 (DE) ...................... 20 2018 105 949.1

(51) Int. Cl.
*B23B 29/04* (2006.01)
*B22F 10/20* (2021.01)
(Continued)

(52) U.S. Cl.
CPC ............ *B23B 29/043* (2013.01); *B22F 10/20* (2021.01); *B23B 27/04* (2013.01); *B23B 27/10* (2013.01); *B23B 2250/12* (2013.01)

(58) Field of Classification Search
CPC ....... B23B 29/043; B23B 27/04; B23B 27/10; B23B 2250/12; B23B 2205/02;
(Continued)

(56) References Cited

U.S. PATENT DOCUMENTS 7,959,384 B2 * 6/2011 Breisch ................. B23B 29/043
407/113
9,259,788 B2 * 2/2016 Malka ..................... B23B 27/10
(Continued)

FOREIGN PATENT DOCUMENTS

AT             17072 U1 *  4/2021  ............ B23B 27/04
CN         107999797 A     5/2018
(Continued)

OTHER PUBLICATIONS

International Search Report for International Application No. PCT/EP2019/077965, mailed Jan. 30, 2020.
(Continued)

*Primary Examiner* — Sara Addisu
(74) *Attorney, Agent, or Firm* — Jason H. Vick; Womble Bond Dickinson (US) LLP (57) ABSTRACT

A tool holder for a tool for machining a workpiece. The tool holder has a cutting insert receptacle for receiving a cutting insert, wherein the cutting insert receptacle has an upper clamping jaw for abutting an upper surface of the cutting insert and a lower clamping jaw for abutting a lower surface of the cutting insert opposite the upper surface. Further, the tool holder has an internal coolant channel extending inside the tool holder between a coolant inlet opening and a coolant outlet opening, wherein an end portion of the coolant channel extending inside the upper clamping jaw along a channel center axis opens into the coolant outlet opening. The coolant outlet opening is arranged at the upper clamping jaw and configured as an elongated opening. A width of the coolant outlet opening is smaller than a height of the coolant outlet opening measured orthogonally to the width of the coolant outlet opening. The end portion of the coolant channel is also elongated in a cross-section orthogonal to the channel center axis. A width of the end portion measured orthogonal to the channel center axis is smaller than a height (Continued)

of the end portion measured orthogonal to the channel center axis and orthogonal to the width of the end portion.

17 Claims, 6 Drawing Sheets

(51) Int. Cl.
*B23B 27/04* (2006.01)
*B23B 27/10* (2006.01)

(58) Field of Classification Search
CPC .... B23B 29/04; B22F 2005/001; B22F 10/20; B22F 5/10; Y02P 10/25; B33Y 80/00; B23Q 11/10
See application file for complete search history.

(56) References Cited

U.S. PATENT DOCUMENTS

| | | | |
|---|---|---|---|
| 10,029,313 B2 | 7/2018 | Kaufmann | |
| 10,661,352 B2 | 5/2020 | Kaufmann et al. | |
| 11,806,792 B2* | 11/2023 | Kobayashi | B23B 1/00 |
| 2012/0230780 A1* | 9/2012 | Henry | B23B 27/10 407/11 |
| 2016/0339523 A1 | 11/2016 | Graf et al. | |
| 2017/0252839 A1 | 9/2017 | Donisi et al. | |
| 2018/0326500 A1* | 11/2018 | Kaufmann | B23B 27/083 |
| 2019/0184467 A1 | 6/2019 | Nage | |
| 2019/0366444 A1* | 12/2019 | Henzler | B23B 27/1677 |
| 2020/0180040 A1* | 6/2020 | Andoh | B23B 27/10 |
| 2021/0299757 A1* | 9/2021 | Goeberl | B23B 29/043 |
| 2021/0402485 A1* | 12/2021 | Ishai | B23B 27/086 |
| 2021/0402489 A1* | 12/2021 | Blabes | B23B 27/086 |
| 2022/0016717 A1* | 1/2022 | Hecht | B23B 27/086 |
| 2023/0173586 A1* | 6/2023 | Ishai | B23B 27/04 407/11 |
| 2023/0347426 A1* | 11/2023 | Kiso | B23B 27/04 |

FOREIGN PATENT DOCUMENTS

| | | | | |
|---|---|---|---|---|
| DE | 8126791 U1 | 3/1983 | | |
| DE | 102014119295 A1 | 6/2016 | | |
| DE | 102017110132 A1 | 11/2018 | | |
| EP | 2821167 A1 * | 1/2015 | | B23B 27/04 |
| EP | 2898967 A1 * | 7/2015 | | B23B 27/04 |
| EP | 3103573 A1 | 12/2016 | | |
| EP | 3693110 A1 * | 8/2020 | | B23B 27/10 |
| JP | 2018027605 A * | 2/2018 | | B23B 27/10 |
| WO | WO 2018/034339 | 2/2018 | | |
| WO | WO-2019102461 A1 * | 5/2019 | | B23B 27/04 |

OTHER PUBLICATIONS

Written Opinion for International Application No. PCT/EP2019/077965, mailed Jan. 30, 2020.
International Preliminary Report on Patentability for International Application No. PCT/EP2019/077965, mailed Apr. 29, 2021.

* cited by examiner

TOOL HOLDER AND TOOL

CROSS REFERENCE TO RELATED APPLICATIONS

This application is a continuation of international patent application PCT/EP2019/077965, filed on Oct. 15, 2019 designating the U.S., which international patent application has been published in German language and claims priority from German patent application DE 10 2018 125 767.8 filed Oct. 17, 2018 and German utility model application DE 20 2018 105 949.1 filed on Oct. 17, 2018. The entire contents of these priority applications are incorporated herein by reference.

BACKGROUND

This disclosure relates to a tool holder for a tool for machining a workpiece. The disclosure also relates to the tool comprising the tool holder and a cutting insert arranged on the tool holder.

The tool is preferably configured as a turning tool. Particularly preferably, the tool is a turning tool that is used for groove turning and cut-off turning.

The tool or the tool holder can, for example, be configured as a parting blade. Alternatively, the tool holder of the tool can also be configured as a tool holder cassette, which is used in a CNC lathe in an already known manner. Regardless of whether the tool holder has the form of a parting blade or is configured as a tool holder cassette, the tool is preferably used for groove turning with very narrow grooving widths. The cutting insert receptacle of the tool holder as well as the cutting insert inserted therein are therefore preferably designed comparatively narrow to enable such machining (narrow grooving widths).

A particular challenge in turning narrow grooves is the supply of coolant and lubricant (hereinafter referred to simply as "coolant"). In order to guarantee the best possible cooling and lubrication of the cutting insert in contact with the workpiece, the coolant should reach the machining point as precisely as possible within the groove to be produced.

Due to the comparatively narrow configuration of the tool holder, particularly in the area of the cutting insert, the coolant channels usually provided inside the tool holder for such molds must therefore be very small. On the other hand, however, this limits the amount of coolant supply per unit of time.

EP 3 103 573 A1, for example, discloses a parting blade with an internal coolant channel which emerges from the tool holder of the parting blade above the cutting insert. Another parting blade with an internal coolant channel is known from DE 81 26 791 A1.

The coolant outlets of the two parting blades mentioned above are relatively small for the reasons mentioned above. In order to supply the machining area with sufficient coolant, the coolant must therefore be pressurized to a very high level. In addition, it is relatively difficult to align the very small coolant outlet so precisely that the resulting very fine coolant jet is directed to the machining point in the desired manner.

It would therefore be desirable to make the coolant outlet somewhat larger in the area of the cutting insert receptacle, despite the very narrow design of the tool holder, in order to be able to increase the coolant quantity per unit of time and to produce a coolant jet that is not quite so fine.

SUMMARY

It is an object to provide a tool holder and an associated tool which is particularly suitable for machining narrow grooving widths and to ensure an improved coolant supply to the machining point at which the cutting insert engages with the workpiece to be machined, compared to the prior art.

According to a first aspect, a tool holder is presented that comprises:
- a cutting insert receptacle for receiving a cutting insert, wherein the cutting insert receptacle comprises an upper clamping jaw for abutting an upper surface of the cutting insert and a lower clamping jaw for abutting a lower surface of the cutting insert opposite the upper surface; and
- an internal coolant channel extending inside the tool holder between a coolant inlet opening and a coolant outlet opening, wherein an end portion of the coolant channel extending inside the upper clamping jaw along a channel center axis opens into the coolant outlet opening;
- wherein the coolant outlet opening is arranged at the upper clamping jaw and is configured as an elongated opening, wherein a width of the coolant outlet opening is smaller than a height of the coolant outlet opening measured orthogonally to the width of the coolant outlet opening, and
- wherein the end portion of the coolant channel is also elongated in a cross-section orthogonal to the channel center axis, wherein a width of the end portion measured orthogonal to the channel center axis is smaller than a height of the end portion measured orthogonal to the channel center axis and orthogonal to the width of the end portion.

According to a second aspect, a tool is presented that comprises:
- a tool holder having a cutting insert receptacle and an internal coolant channel extending inside the tool holder between a coolant inlet opening and a coolant outlet opening; and
- a cutting insert arranged in the cutting insert receptacle;
- wherein the cutting insert receptacle comprises an upper clamping jaw that is configured to abut an upper surface of the cutting insert and a lower clamping jaw that is configured to abut a lower surface of the cutting insert opposite the upper surface;
- wherein an end portion of the coolant channel extending inside the upper clamping jaw along a channel center axis opens into the coolant outlet opening;
- wherein the coolant outlet opening is arranged at the upper clamping jaw and configured as an elongated opening, wherein a width of the coolant outlet opening is smaller than a height of the coolant outlet opening measured orthogonally to the width of the coolant outlet opening, and
- wherein the end portion of the coolant channel is elongated in a cross-section orthogonal to the channel center axis, wherein a width of the end portion measured orthogonal to the channel center axis is smaller than a height of the end portion measured orthogonal to the channel center axis and orthogonal to the width of the end portion.

Hence, in the presented tool holder and in the presented tool, both the end portion and the coolant outlet opening have an elongated shape, the width of which is smaller than the height thereof. In this way, both the end portion of the coolant channel and the coolant outlet opening can be configured to be as large as possible even with a very narrow design of the upper clamping jaw of the tool holder. Consequently, even with a very narrow design of the upper clamping jaw, a comparatively large amount of coolant can leave the coolant outlet opening. The machining point, i.e. the point at which the cutting insert comes into contact with the workpiece to be machined, can therefore be sufficiently well supplied with coolant even in the case of turning tools for machining very narrow grooves.

The mentioned width and height of the end portion refer in the present case to the orthogonally aligned geometrical dimensions of the end portion, which the cross-section of the end portion, which is aligned orthogonally to the channel center axis, has.

In the present context, the channel center axis is understood to be the center axis which is arranged centrally in the end portion of the coolant channel and along which the coolant channel extends longitudinally.

The end portion of the coolant channel is preferably not bent. In other words, the channel center axis is a straight line in the area of the end portion of the coolant channel, which straight line runs centrally along the end portion of the coolant channel. The cross-section of the end portion oriented orthogonally the channel center axis can, but need not, be oriented mirror-symmetrically to the channel center axis.

According to a refinement, the height of the end portion increases along the channel center axis toward the coolant outlet opening.

The closer the coolant channel approaches the coolant outlet opening, the more its height increases, in other words. The coolant jet emerging from the coolant duct is thus fanned out in the area of the end portion along the height of the end portion. The resulting comparatively highly fanned-out coolant jet leaving the coolant outlet opening can supply coolant to a relatively large part of the groove to be produced with the tool.

Preferably, the height of the end portion increases continuously along the channel center axis towards the coolant outlet opening. Compared to a discontinuous, abrupt increase (for example, an increase in steps), such a continuous increase in the height of the end portion of the coolant channel is of great advantage from a fluid-dynamic point of view, since no or at least very little turbulent flow is generated in the coolant channel flow as a result.

According to a further refinement, the coolant outlet opening is arranged in a plane oriented at an acute angle to a holder longitudinal axis along which the tool holder extends longitudinally.

In other words, the front side of the upper clamping jaw, on which the coolant outlet opening is arranged, runs at an angle to the holder longitudinal axis. This inclination or beveling of the coolant outlet opening alone would automatically result in an elongated coolant outlet opening, the width of which is less than the height thereof, even in the case of a coolant channel having a circular cross-section. In the tool holder, however, as already mentioned, the end portion of the coolant channel is also elongated, so that this sloping arrangement of the coolant outlet opening here additionally reinforces the already existing elongated shape.

Preferably, the channel center axis runs obliquely or at an acute angle to the holder longitudinal axis so that the coolant jet emerging from the coolant outlet opening is directed obliquely from above towards the cutting insert. The plane in which the coolant outlet opening is arranged preferably also runs obliquely or at an acute angle to the channel center axis.

According to a preferred refinement, the coolant outlet opening is oval.

However, "oval" is not only understood to mean egg-shaped or elliptical. In the present case, "oval" also means a shape similar to the shape of a running track in an athletics stadium.

According to another preferred refinement, the oval coolant outlet opening is formed by two parallel straight flanks and two arcuate sections connected to opposite ends of the straight flanks.

Such an oval shape has the particular advantage that no sharp-edged corners occur which could lead to turbulence within the coolant flow, and that at the same time a coolant jet which is fanned out in height but still directed can be produced.

According to a further refinement, an initial portion of the coolant channel adjacent the coolant inlet opening has a circular cross-section.

The coolant channel thus preferably transitions inside the tool holder from a portion with a circular cross-section to a portion with an elongated cross-section. Preferably, the initial portion is located inside a base body of the tool holder, the width of which is larger compared to the upper clamping jaw. A coolant channel portion with a circular cross-section is preferred in this part of the tool holder, since the coolant channel does not have to be narrow in this area and thus the volume of the coolant channel or the initial portion of the coolant channel can be increased due to the circular cross-section. The initial portion of the coolant channel is preferably longer than the end portion of the coolant channel. It thus forms the major part of the coolant channel.

In an alternative refinement, however, the entire coolant channel, i.e. including the initial portion of the coolant channel, is elongated or oval. This is particularly advantageous when the tool holder is configured as a parting blade, since tool holders of parting blades are usually very narrow over their entire length to allow very large grooving depths.

In the case of the refinement of the initial portion of the coolant channel with a circular cross-section, the diameter of the cross-section of the initial portion is preferably larger than the width of the end portion, but smaller than the height of the end portion.

In this refinement, the coolant channel tapers in the width direction between the initial portion and the end portion. This results in a kind of nozzle effect by which the coolant jet is accelerated in the width direction and thus focused in the width direction. In the height direction, on the other hand, the coolant jet is fanned out, as already mentioned above.

According to a further refinement, a middle portion of the coolant channel connecting the initial portion to the end portion has a circular cross-section at a first end adjacent the initial portion and an elongated cross-section at a second end adjacent the end portion, wherein the cross-section of the middle portion varies continuously between the first end and the second end.

The middle portion thus serves as a kind of transition portion through which the said change in cross-section of the coolant channel is generated. The continuously changing cross-section in the middle portion is again advantageous from a fluid-dynamic point of view.

A coolant channel with such a complex shape, as described here for the initial portion, the middle portion and the end portion as well as their transitions, can be produced advantageously, in particular by additive manufacturing. The tool holder is therefore preferably as a whole manufactured by means of additive manufacturing. In this additive manufacturing process, the coolant channel is generated at the same time in the additive manufacturing step. Subsequent generation of the coolant channel would otherwise be very costly due to the mentioned shape.

According to a further refinement, the end portion is arranged inside the upper clamping jaw, whereas the middle portion and the initial portion are arranged inside the tool holder but not inside the upper clamping jaw.

Preferably, the initial portion of the coolant channel is bent. Particularly preferably, the initial portion has a curvature that varies continuously along the course of the coolant channel. Here, too, there are preferably no corners that cause turbulent flows in the coolant flow. Without the previously mentioned additive manufacturing, by means of which the tool holder is preferably manufactured, such a continuously curved coolant channel would hardly be possible to produce. With additive manufacturing of the tool holder, on the other hand, this is possible without any problems.

According to a further refinement, the tool holder comprises at least one bore, wherein the coolant channel extends inside the tool holder around the at least one bore.

With a bent configuration of the initial portion of the coolant channel, it is easily possible to meander the coolant channel around the bores, so to speak.

According to a further refinement, the coolant channel comprises a second coolant outlet opening arranged in or below the lower clamping jaw.

Thus, the cutting insert can also be cooled from below. In this refinement, the coolant exits the tool holder both above the cutting insert (at the first coolant outlet opening) and below the cutting insert (at the second coolant outlet opening). The second coolant outlet opening is preferably also connected to the coolant inlet opening. The coolant channel thus preferably branches inside the tool holder.

The second coolant outlet opening can be arranged in the lower clamping jaw, and particularly preferably the second coolant outlet opening is arranged at a forwardly projecting base of a so-called support, which is arranged below the lower clamping jaw (i.e. on the side facing away from the upper clamping jaw).

It is understood that the above-mentioned features and those to be explained below can be used not only in the combination indicated in each case, but also in other combinations or on their own, without departing from the spirit and scope of the present disclosure.

DESCRIPTION OF PREFERRED EMBODIMENTS

FIGS. 1-7 show several views of an embodiment of the tool. In the drawings, the tool is denoted in its entirety by the reference numeral 10.

Figure 1:
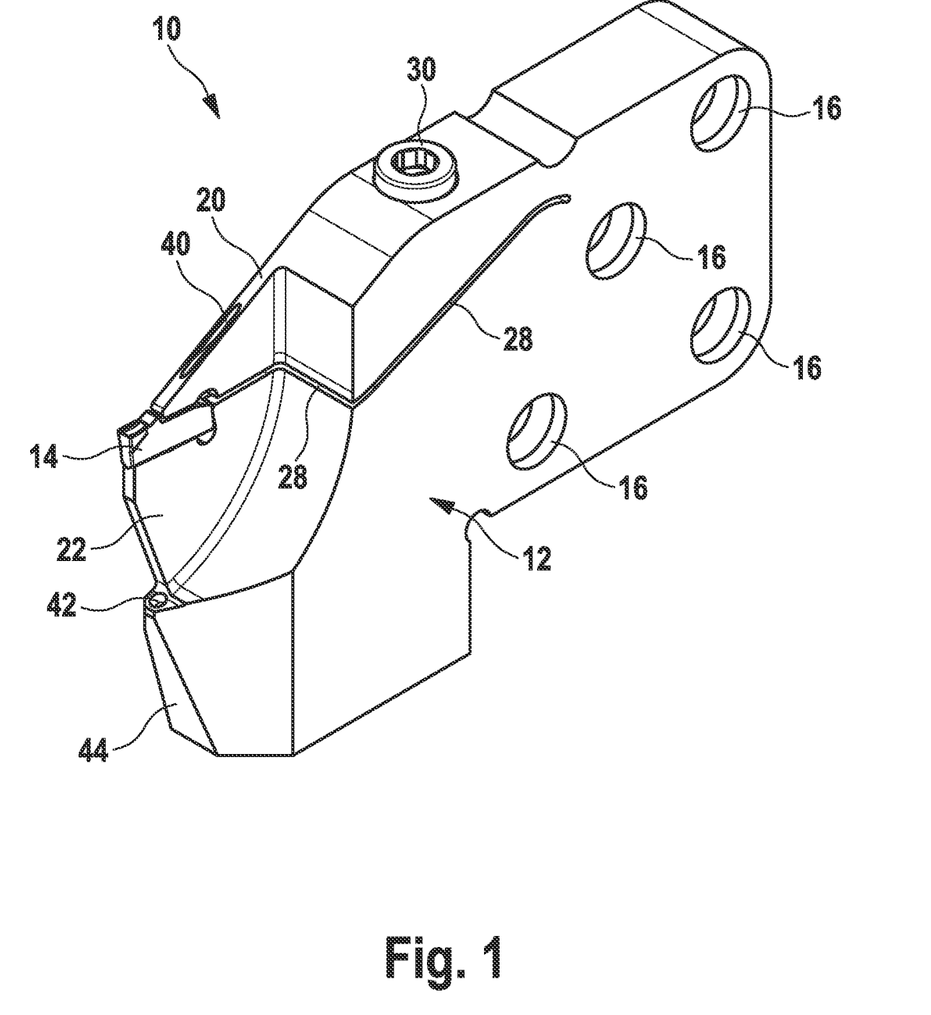
FIG. 1 shows a perspective view of an embodiment of the tool.
Figure 2:
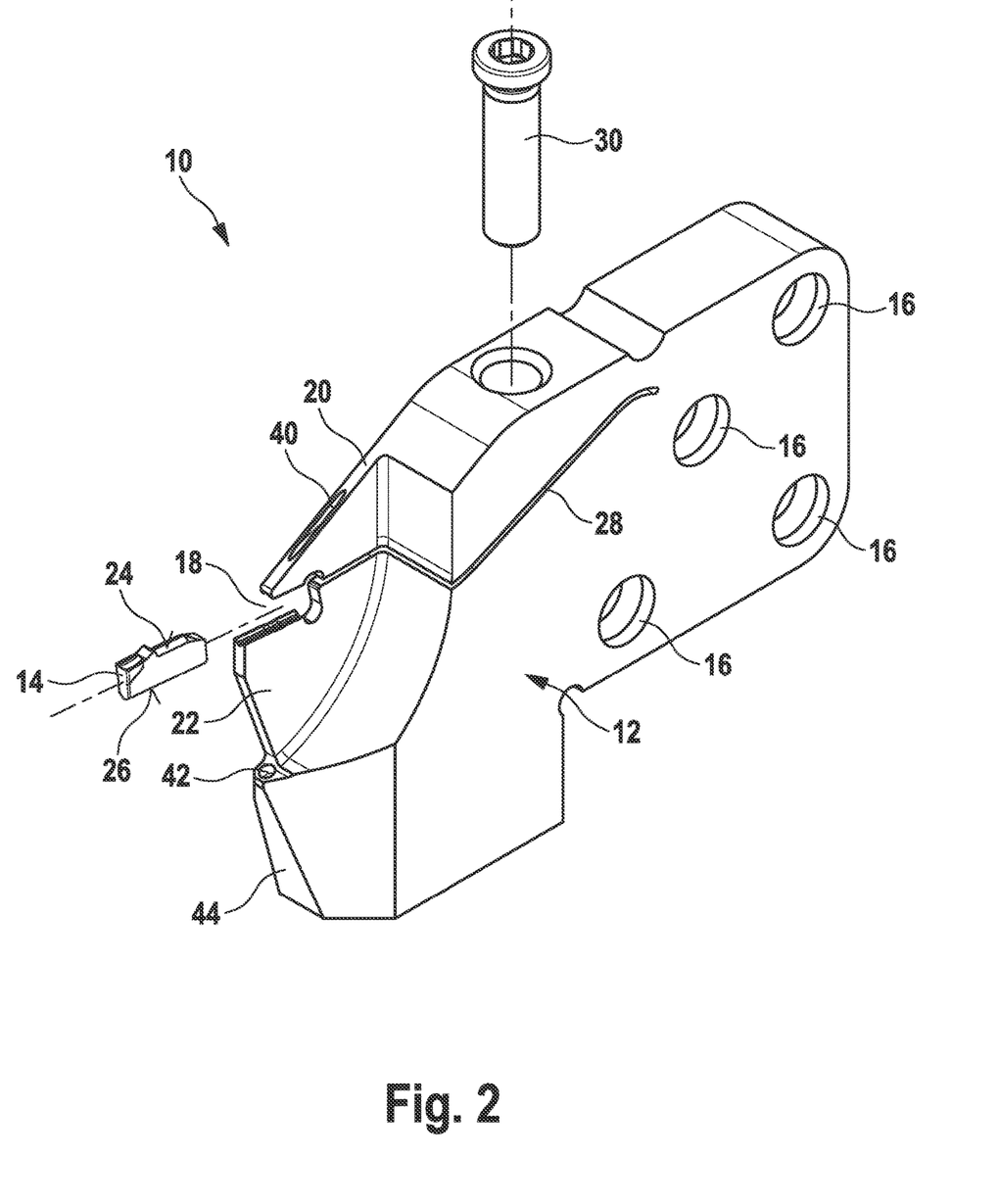
FIG. 2 shows an exploded view of the tool shown in FIG. 1.

The tool 10 comprises a tool holder 12 and a cutting insert 14 that can be clamped therein. In the present embodiment, the tool holder 12 is configured as a tool holder cassette that can be clamped in a machine tool, for example in a CNC lathe. Clamping in the machine tool is typically done via a plurality of clamping means which engage in bores 16 that are provided for this purpose in the tool holder 12.

An advantage of such tool holder cassettes is that several tool holder cassettes of different types, which are e.g. suitable for different types of turning operations, can be easily attached to the machine tool so that, depending on the desired type of machining, it is possible to switch quickly between the different tools.

The tool holder 12 according to the embodiment shown in FIG. 1 comprises a cutting insert receptacle 18 in the area of its front end for receiving and detachably fastening the cutting insert 14. The cutting insert receptacle 18 is formed by an upper clamping jaw 20 and a lower clamping jaw 22. The two clamping jaws 20, 22 are spaced apart from each other. There is a space between them which defines the cutting insert receptacle 18. In the assembled state of the tool 10, the cutting insert 14 is arranged in this intermediate space and clamped between the upper clamping jaw 20 and the lower clamping jaw 22. The upper clamping jaw 20 abuts an upper surface 24 of the cutting insert 14. The lower clamping jaw 22 abuts a lower surface 26 of the cutting insert 14 opposite the upper surface 24.

In the present embodiment, a separation slit 28 is provided in the tool holder 12. This separation slit 28 separates the upper clamping jaw 20 from the lower clamping jaw 22. The separation slit 28 enables an at least partial elastic movement of the two clamping jaws 20, 22 relative to each other. To generate an additional clamping force by means of which the cutting insert 14 is clamped in the cutting insert receptacle 18, the tool 10 in the shown embodiment comprises a clamping screw 30 which is screwed through the separation slit 28 into an internal thread 32 provided in the tool holder 12. By screwing the clamping screw 30 into the internal thread 32, the upper clamping jaw 20 is moved in the direction of the lower clamping jaw 22, so that the height of the cutting insert receptacle 18 is reduced and the clamping force exerted on the cutting insert 14 is increased. To release the cutting insert 14 from the tool holder 12, the clamping screw 30 accordingly must then be loosened again.

In the present embodiment, the clamping screw 30 is inserted orthogonally to a longitudinal axis 34 along which the tool holder 12 longitudinally extends. However, it is clear that this does not necessarily need to be like this. For example, the clamping screw 30 could also be inserted into the tool holder 12 at an acute angle to the longitudinal axis 34. Likewise, embodiments are conceivable in which such a clamping screw 30 is dispensed with entirely. In such embodiments, the pretension between the upper clamping jaw 20 and the lower clamping jaw 22 is already sufficient to exert a sufficiently large clamping force on the cutting insert 14. To loosen or replace the cutting insert, it is then usually necessary to use an expanding wrench, by means of which the cutting insert holder 18 is expanded in order to be able to remove the cutting insert 14 from the tool holder 12.

Figure 3:
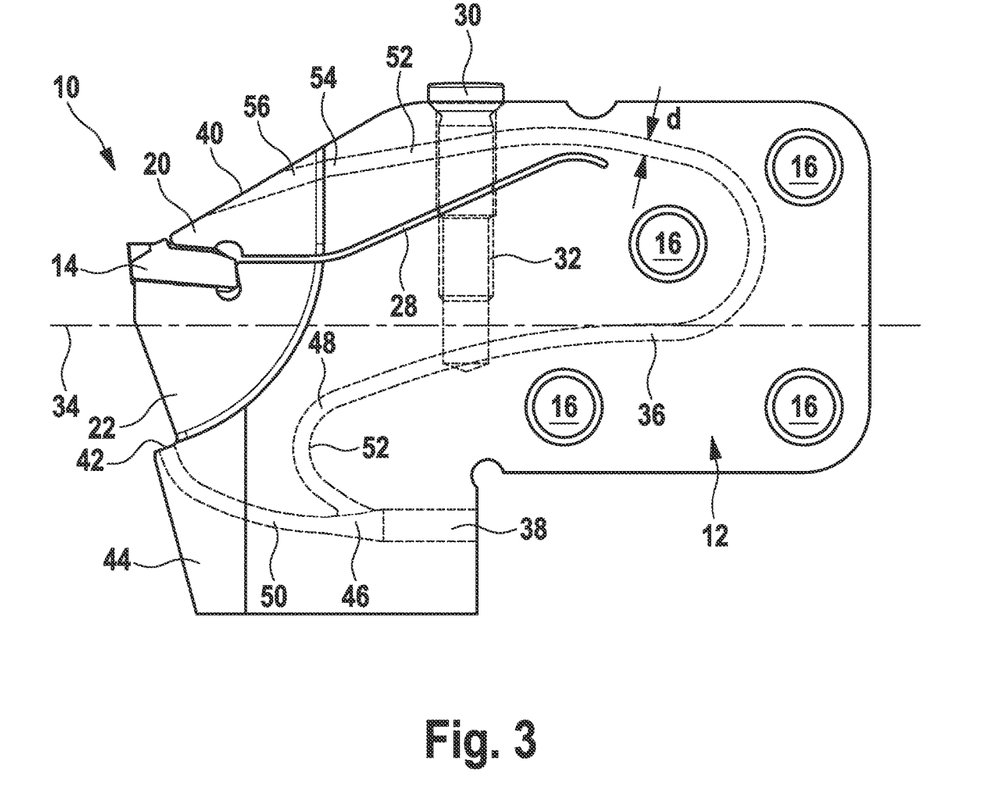
FIG. 3 shows a side view of the tool shown in FIG. 1, wherein the tool holder of the tool is shown partially transparent to illustrate its interior.
Figure 4:
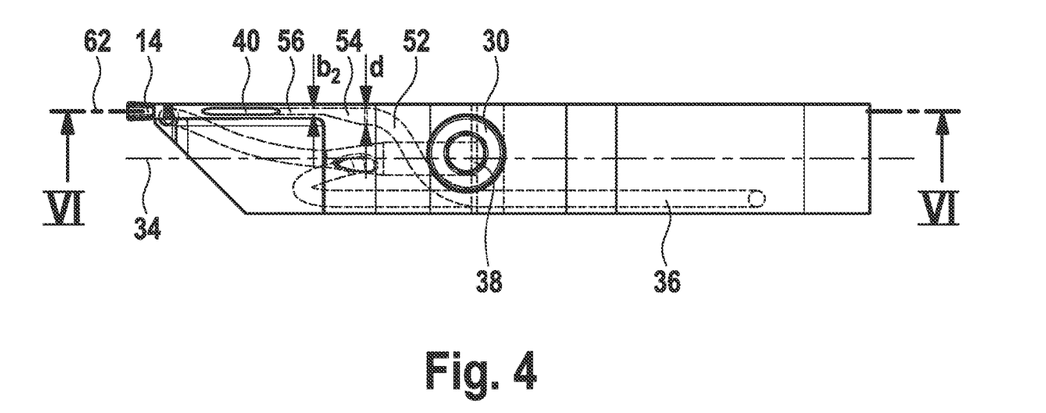
FIG. 4 shows a top view of the tool shown in FIG. 1, wherein the tool holder of the tool is shown partially transparent to illustrate its interior.
Figure 5:
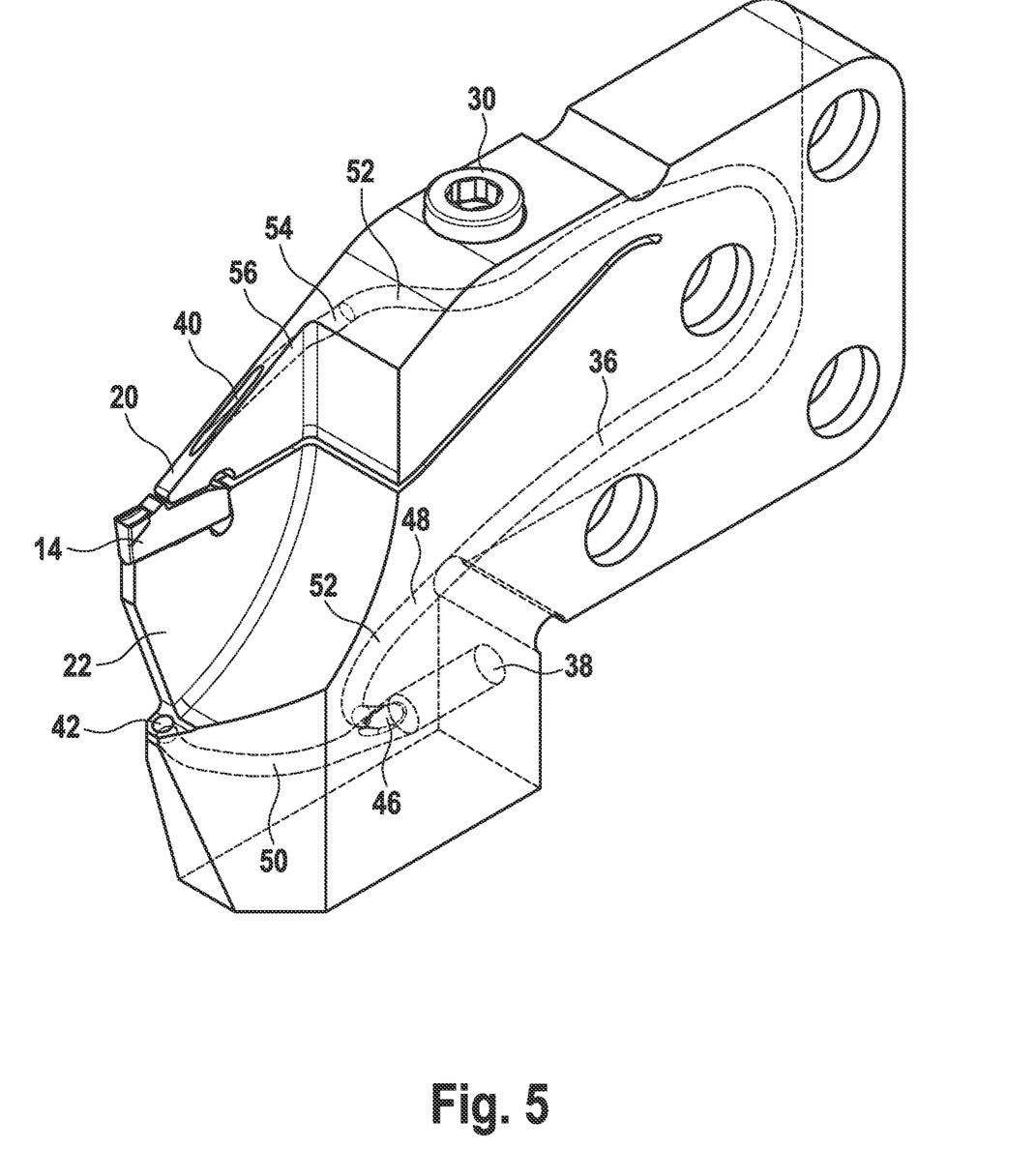
FIG. 5 shows a perspective view of the tool shown in FIG. 1, wherein the tool holder of the tool is shown partially transparent to illustrate its interior.

The tool holder 12 further comprises in its interior a coolant channel 36, which can be seen particularly in FIGS. 3-5. This coolant channel 36 serves for guiding coolant or lubricant, which is usually subjected to a high pressure and is sprayed into the region of the cutting insert 14, i.e. into the region of the machining point of the workpiece, during use of the tool 10. The coolant channel 36 extends between a coolant inlet opening 38 and a coolant outlet opening 40.

The coolant outlet opening 40 is arranged at the upper clamping jaw 20, to thereby direct coolant onto the cutting insert 14, preferably from obliquely above.

In the present embodiment, the coolant channel 36 comprises a further coolant outlet opening 42, which is referred to herein as second coolant outlet opening 42. However, this second coolant outlet opening 42 is only an optional feature of the tool 10. The second coolant outlet opening 42 is arranged below the cutting insert receptacle 18. More specifically, in the present embodiment, the second coolant outlet opening 42 is arranged on a forwardly projecting protrusion of a so-called support 44, which is adjacent to a lower end of the lower clamping jaw 22 and supports or mechanically stabilizes the lower clamping jaw 22. Inside the tool holder 12, the coolant channel 36 branches at a branch point 46 into a first sub-channel 48, which opens into the coolant outlet opening 40, and a second sub-channel 50, which opens into the second coolant outlet opening 42. However, as mentioned above, the second sub-channel 50 and the second coolant outlet opening 42 may in principle be omitted without departing from the spirit and scope of the present disclosure. Therefore, In the following, mainly the embodiment of the first sub-channel 48 of the coolant channel 36 is discussed in more detail.

The coolant channel 36, in particular its first sub-channel 48, meanders through the interior of the tool holder 12 (see in particular FIGS. 3-5). It runs around the bores 16 as well as around the clamping screw 30. The coolant channel 36 is therefore configured to be bent at several points. Particularly preferably, the coolant channel 36 has a continuously changing curvature along its course. Hence, it has preferably no sharp corners, sharp or step-like shoulders. This is particularly advantageous from a fluid-dynamic point of view, as it allows undesirable turbulent flows within the coolant channel 36 to be avoided or at least reduced to a minimum.

The coolant channel 36, in particular its first sub-channel 38, comprises a plurality of portions, which are referred to herein as initial portion 52, middle portion 54, and end portion 56.

The initial portion 52 forms the first portion of the coolant channel 36, or the first channel part 48 thereof. It is adjacent to the coolant inlet opening 38 and extends along a majority of the length of the coolant channel 36. In this initial portion 52, the coolant channel 36 preferably has a circular cross-section.

The end portion 56 forms the other end of the first sub-channel 48 of the coolant channel 36. The end portion 56 is arranged in the upper clamping jaw 20 and opens into the coolant outlet opening 40. The end portion 56 of the coolant channel 36 as well as the coolant outlet opening 40 each have an elongated cross-section, the width of which is less than its height measured orthogonally thereto.

The middle portion 54 of the coolant channel 36 forms the transition between the initial portion 52 and the end portion 56. Thus, a first end of the middle portion 54 adjoins the initial portion 52 and a second, opposite end of the middle portion 54 adjoins the end portion 56. Like the initial portion 52, the middle portion 54 is preferably arranged within the base body of the tool holder 12, i.e. not within the upper clamping jaw 20. Preferably, only the end portion 56 is arranged inside the upper clamping jaw 20. The transition between the middle portion 54 and the end portion 56 thus preferably takes place in the region of the transition between the base body of the tool holder 12 and the upper clamping jaw 20.

Figure 7:
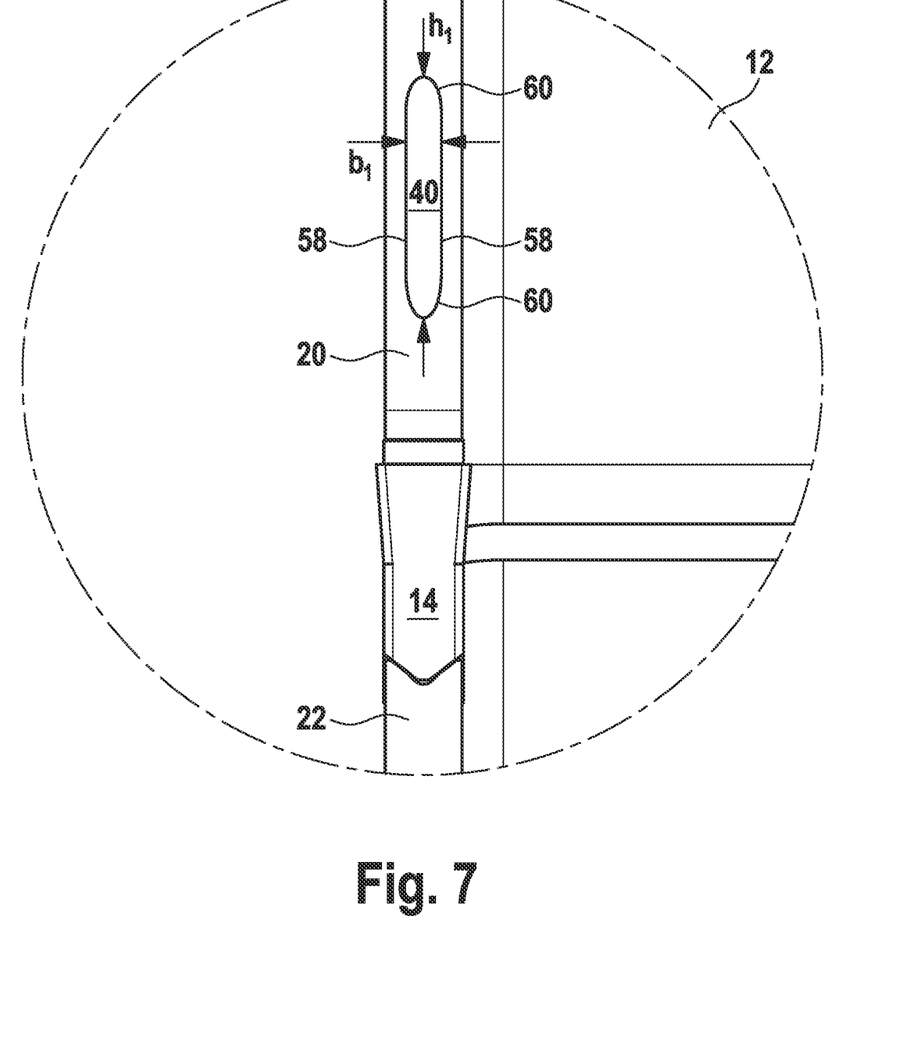
FIG. 7 shows a detailed view of a coolant outlet of the tool holder in a top view from the front.

The coolant outlet opening 40, which is arranged at the upper clamping jaw 20, is configured as an elongated opening whose width $b_1$ is smaller than its height $h_1$ measured orthogonally thereto (see in particular FIG. 7). The coolant outlet opening 40 preferably has an oval shape. This oval shape can, for example, be elliptical or egg-shaped. However, in the present embodiment, the oval coolant outlet opening 40 comprises two parallel flanks 58 and two arcuate sections 60 connected to opposite ends of the straight flanks 58. The arcuate sections 60 may be shaped as semicircles or as half-ellipses. Preferably, the straight flanks 58 each merge into the arcuate sections 60 in a continuous progression.

The end portion 56 of the coolant channel 36 adjoining the coolant outlet 40 is also elongated. The end portion 56 extends longitudinally along a channel center axis 62, which extends in the middle or centrally along the end portion 56 (see in particular FIG. 1). The end portion 56 has an elongated cross-section particularly with respect to this channel center axis 62. More specifically, a width $b_2$ of the end portion 56 measured orthogonally to the channel center axis 62 is less than a height $h_2$ of the end portion 56 measured orthogonally to the channel center axis 62 and orthogonally to the width $b_2$ (see particularly FIGS. 4 and 6).

Thus, not only the coolant outlet opening 40 but also the end portion 56 has an elongated, preferably oval shape. The coolant jet is therefore fanned out in the direction of or parallel to the height $h_1$ and $h_2$ and laterally focused along the width $b_1$ and $b_2$. This is particularly advantageous for tools with comparatively narrow upper clamping jaws 20, which are used for machining grooves with comparatively small groove widths. Also in such a case, even when machining small groove widths, a sufficiently large coolant flow can be guaranteed, which can be optimally used for cooling and lubricating the usually narrowly designed machining area.

The channel center axis 62 of the end portion 56 is preferably oriented at an acute angle to the longitudinal axis 34 of the tool holder 12. In addition, the front face of the upper clamping jaw 20 is preferably beveled so that the coolant outlet opening 40 arranged on this front face of the upper clamping jaw 20 is also oriented at an acute angle to the longitudinal axis 34 of the tool holder 12. The jet of coolant emerging from the coolant outlet opening 40 thus impinges on the cutting insert 14 from obliquely above.

Figure 6:
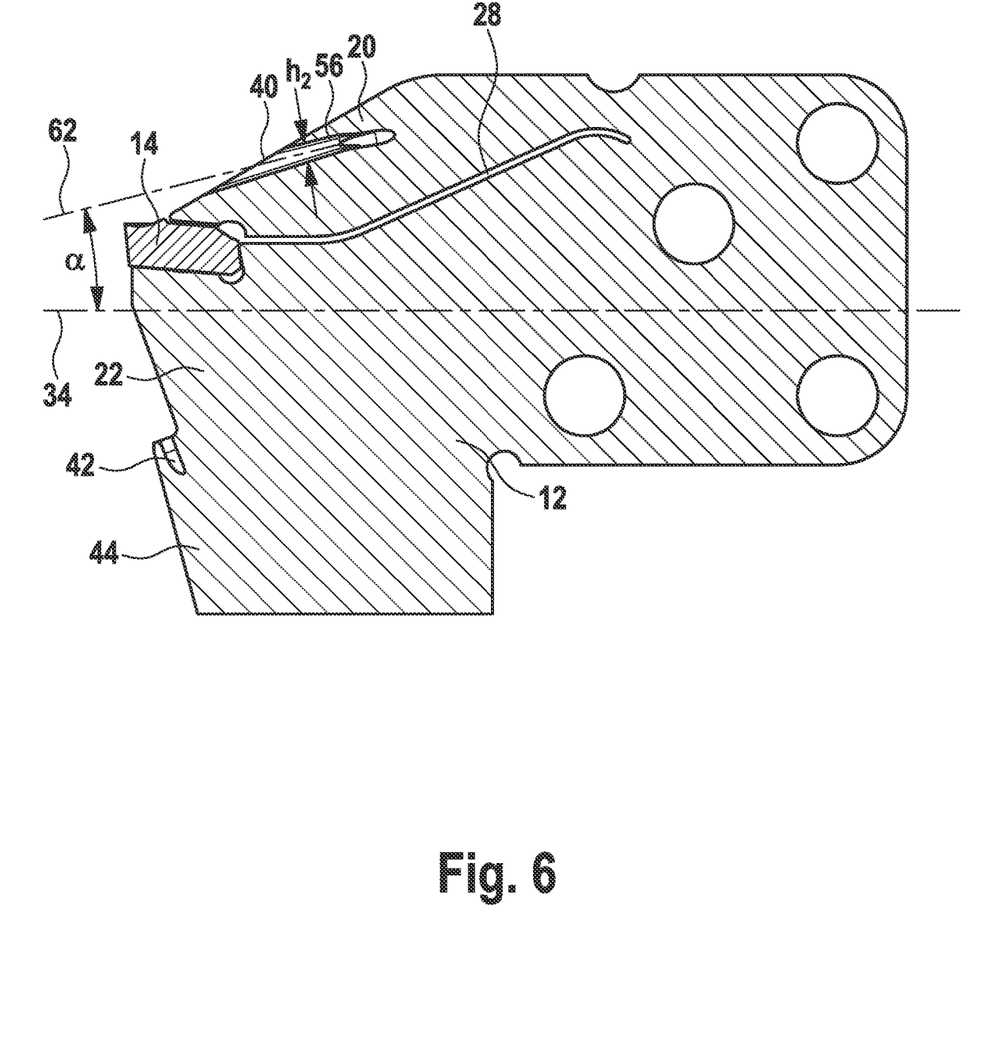
FIG. 6 shows a sectional view of the tool shown in FIG. 1.

Preferably, the height $h_1$ of the end portion 56 increases along the channel center axis 62 towards the coolant outlet opening 40 (see FIG. 6). The increase in height $h_2$ preferably occurs continuously along the channel center axis 62. This advantageously contributes to the aforementioned fanning out of the coolant jet.

As can be seen from FIG. 4, the width $b_2$ is preferably constant along the channel center axis 62 in the end portion 56.

The middle portion 54 of the coolant channel 36 has a somewhat more complex configuration in the present embodiment. In this middle portion 54, the coolant channel 36 transitions from its initially circular cross-section in the initial portion 52 to the described elongated or oval cross-section in the end portion 56. Preferably, the diameter d of the circular cross-section of the coolant channel 36 in the initial portion 52 is larger than the width $b_2$ of the end portion 56, but smaller than the height $h_2$ of the end portion 56. Accordingly, the cross-section of the coolant channel 36 in the middle portion 54 decreases in width, but increases in height. However, an increase in height is not necessarily required, since the height $h_2$ of the end portion 56 at the transition to the middle portion 54 can also be the same as the diameter d of the initial portion 52. In such a case, the coolant channel 36 in its middle portion 54 would therefore only be reduced in width, but not in height. This is possible because the height $h_2$ of the coolant channel 36 in the end portion 56 preferably increases towards the coolant outlet opening 40, as already mentioned.

Such a relatively complex shaped coolant channel 36, as previously described, can be most easily and cost-effectively manufactured by additive manufacturing of the tool holder 12. The tool holder 12 is preferably manufactured in its entirety by means of additive manufacturing.

Finally, it should be mentioned that the above-described division of the coolant channel 36 into initial portion 52, middle portion 54 and end portion 56 is not absolutely necessary. Particularly in case of a configuration of the tool holder 12 with an overall small width, for example in the case of a configuration of the tool holder 12 as a parting blade, the coolant channel 36 can also be configured with an overall elongated or oval cross-section. In such a case, a transition between the circular cross-section and the oval or elongated cross-section, as described above for the middle portion 54, can be dispensed with. Thus, the coolant channel 36 could then also be formed with a constant cross-section (elongated or oval) that is unchanged along the course of the channel. In principle, the coolant channel 36 can also be formed with a constant cross-section in its end portion 56 without its height $h_2$ increasing in the direction towards the coolant outlet opening 40. Further variations, in particular with respect to the shape of the tool holder 12, are also possible without leaving the spirit and scope of the present disclosure. Additive manufacturing of the tool holder 12 is preferred, but not absolutely necessary.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A tool holder for a tool for machining a workpiece, comprising:
   a cutting insert receptacle that is configured to receive a cutting insert, wherein the cutting insert receptacle comprises an upper clamping jaw that is configured to abut an upper surface of the cutting insert and a lower clamping jaw that is configured to abut a lower surface of the cutting insert opposite the upper surface; and
   an internal coolant channel extending inside the tool holder between a coolant inlet opening and a coolant outlet opening, the coolant channel comprising an initial portion, a middle portion and an end portion, wherein the middle portion connects the initial portion and the end portion; wherein the end portion of the coolant channel extending inside the upper clamping jaw along a channel center axis opens into the coolant outlet opening;
   wherein the coolant outlet opening is arranged at the upper clamping jaw and configured as an elongated opening, wherein a width of the coolant outlet opening is smaller than a height of the coolant outlet opening measured orthogonally to the width of the coolant outlet opening,
   wherein the end portion of the coolant channel is elongated in a cross-section orthogonal to the channel center axis, wherein a first width of the end portion measured orthogonal to the channel center axis is smaller than a first height of the end portion measured orthogonal to the channel center axis and orthogonal to the first width of the end portion,
   wherein the initial portion of the coolant channel has a circular cross-section having a first diameter,
   wherein the first width is smaller than the first diameter, and wherein the first height is larger than the first diameter,
   wherein in a first section of the middle portion, a cross-section of the middle portion continuously tapers from the first diameter to the first width, and
   wherein in the first section or in a second section of the middle portion different from the first section, the cross-section of the middle portion continuously widens from the first diameter to the first height.

2. The tool holder according to claim 1, wherein the height of the end portion increases along the channel center axis toward the coolant outlet opening.

3. The tool holder according to claim 1, wherein the coolant outlet opening is arranged in a plane oriented at an acute angle to a holder longitudinal axis along which the tool holder extends.

4. The tool holder according to claim 1, wherein the coolant outlet opening is oval.

5. The tool holder according to claim 4, wherein the coolant outlet opening comprises two parallel straight flanks and two arcuate sections connected to opposite ends of the straight flanks.

6. The tool holder according to claim 1, wherein the initial portion of the coolant channel is longer than the end portion of the coolant channel.

7. The tool holder according to claim 1, wherein the middle portion of the coolant channel connecting the initial portion to the end portion has a circular cross-section at a first end adjacent the initial portion and an elongated cross-section at a second end adjacent the end portion, wherein the cross-section of the middle portion varies continuously between the first end and the second end.

8. The tool holder according to claim 7, wherein the end portion is arranged inside the upper clamping jaw and the middle portion and the initial portion are arranged inside the tool holder but not inside the upper clamping jaw.

9. The tool holder according to claim 7, wherein the initial portion has a curvature that varies continuously along a coolant channel path.

10. The tool holder according to claim 1, wherein the tool holder comprises at least one bore, and wherein the coolant channel extends inside the tool holder around the at least one bore.

11. The tool holder according to claim 1, wherein the coolant channel comprises a second coolant outlet opening arranged in or below the lower clamping jaw.

12. The tool holder according to claim 1, wherein the tool holder is manufactured by additive manufacturing.

13. A tool configured for machining a workpiece, comprising:
- a tool holder having a cutting insert receptacle and an internal coolant channel extending inside the tool holder between a coolant inlet opening and a coolant outlet opening, the coolant channel comprising an initial portion, a middle portion and an end portion, wherein the middle portion connects the initial portion and the end portion; and
- a cutting insert arranged in the cutting insert receptacle;
- wherein the cutting insert receptacle comprises an upper clamping jaw that is configured to abut an upper surface of the cutting insert and a lower clamping jaw that is configured to abut a lower surface of the cutting insert opposite the upper surface;
- wherein the end portion of the coolant channel extending inside the upper clamping jaw along a channel center axis opens into the coolant outlet opening;
- wherein the coolant outlet opening is arranged at the upper clamping jaw and configured as an elongated opening, wherein a width of the coolant outlet opening is smaller than a height of the coolant outlet opening measured orthogonally to the width of the coolant outlet opening,
- wherein the end portion of the coolant channel is elongated in a cross-section orthogonal to the channel center axis, wherein a first width of the end portion measured orthogonal to the channel center axis is smaller than a first height of the end portion measured orthogonal to the channel center axis and orthogonal to the first width of the end portion,
- wherein the initial portion of the coolant channel has a circular cross-section having a first diameter,
- wherein the first width is smaller than the first diameter, and wherein the first height is larger than the first diameter,
- wherein in a first section of the middle portion, a cross-section of the middle portion continuously tapers from the first diameter to the first width, and
- wherein in the first section or in a second section of the middle portion different from the first section, the cross-section of the middle portion continuously widens from the first diameter to the first height.

14. The tool holder according to claim 13, wherein the height of the end portion increases along the channel center axis toward the coolant outlet opening.

15. The tool holder according to claim 13, wherein the coolant outlet opening is arranged in a plane oriented at an acute angle to a holder longitudinal axis along which the tool holder extends.

16. The tool holder according to claim 13, wherein the coolant outlet opening is oval.

17. The tool holder according to claim 16, wherein the coolant outlet opening comprises two parallel straight flanks and two arcuate sections connected to opposite ends of the straight flanks.

* * * * *